United States Patent [19]

Singer et al.

[11] Patent Number: 4,484,439
[45] Date of Patent: Nov. 27, 1984

[54] THRUST REVERSAL SYSTEM

[75] Inventors: Victor Singer; Donald V. Lushis, both of Newark, Del.; Thomas J. Kirschner, Jr., North East, Md.

[73] Assignee: Thiokol Corporation, Chicago, Ill.

[21] Appl. No.: 285,224

[22] Filed: Jul. 20, 1981

[51] Int. Cl.$^3$ .............................................. F02K 1/58
[52] U.S. Cl. ...................................... 60/230; 60/254; 239/265.27; 239/265.31
[58] Field of Search ............... 60/228, 229, 232, 254; 239/265.27, 265.31

[56] References Cited

U.S. PATENT DOCUMENTS

| | | | |
|---|---|---|---|
| 2,850,976 | 9/1958 | Seifert | 102/49 |
| 2,933,889 | 4/1960 | Tolkmitt | 60/35.6 |
| 3,036,431 | 5/1962 | Vdolek | 60/229 |
| 3,038,303 | 6/1967 | Gose | 60/35.6 |
| 3,052,091 | 9/1962 | D'Ooge | 60/35.6 |
| 3,177,655 | 4/1965 | White | 60/229 |
| 3,196,610 | 7/1965 | Anderson | 60/254 |
| 3,210,937 | 10/1965 | Perry, Jr. | 60/229 |
| 3,245,217 | 4/1966 | Hook et al. | 60/229 |
| 3,434,291 | 3/1969 | Friedman, Jr. | 60/254 |
| 3,442,083 | 5/1969 | Klotz | 60/229 |
| 3,552,873 | 1/1971 | Ghougasian | 60/228 |

FOREIGN PATENT DOCUMENTS 15216 9/1980 European Pat. Off. .............. 60/229

*Primary Examiner*—Carlton R. Croyle
*Assistant Examiner*—Jeffrey A. Simenauer
*Attorney, Agent, or Firm*—Gerald K. White

[57] ABSTRACT

A thrust reversal system for reducing, neutralizing and/or reversing the thrust vector resultant of a solid propellant rocket motor utilizes a movable conical piston or plenum cover that fits over a plurality of small ports that are arranged in a circumferential band around the aft dome of the rocket motor. Before actuation, the cover seals the ports. When actuated, the cover is retracted aft a pre-set distance to uncover the ports, shock and the stroke time being controlled by a shock absorber which in one embodiment of the invention is of the hydraulic type and in other embodiments is of the mechanical type. The cover becomes a baffle which directs the combustion chamber gas exiting the ports outward and forward. Suitable control of the flow characteristics may be exercised by the setting of the travel distance of the piston cover and the number, size and orientation of the ports. The time to reach a negative thrust vector can be reduced by increasing the size of the hydraulic fluid control orifice or by the use of high rate stroke mechanical shock. The amount of reverse thrust may be increased by optimizing the reversal port area and the reversal nozzle angle.

33 Claims, 13 Drawing Figures

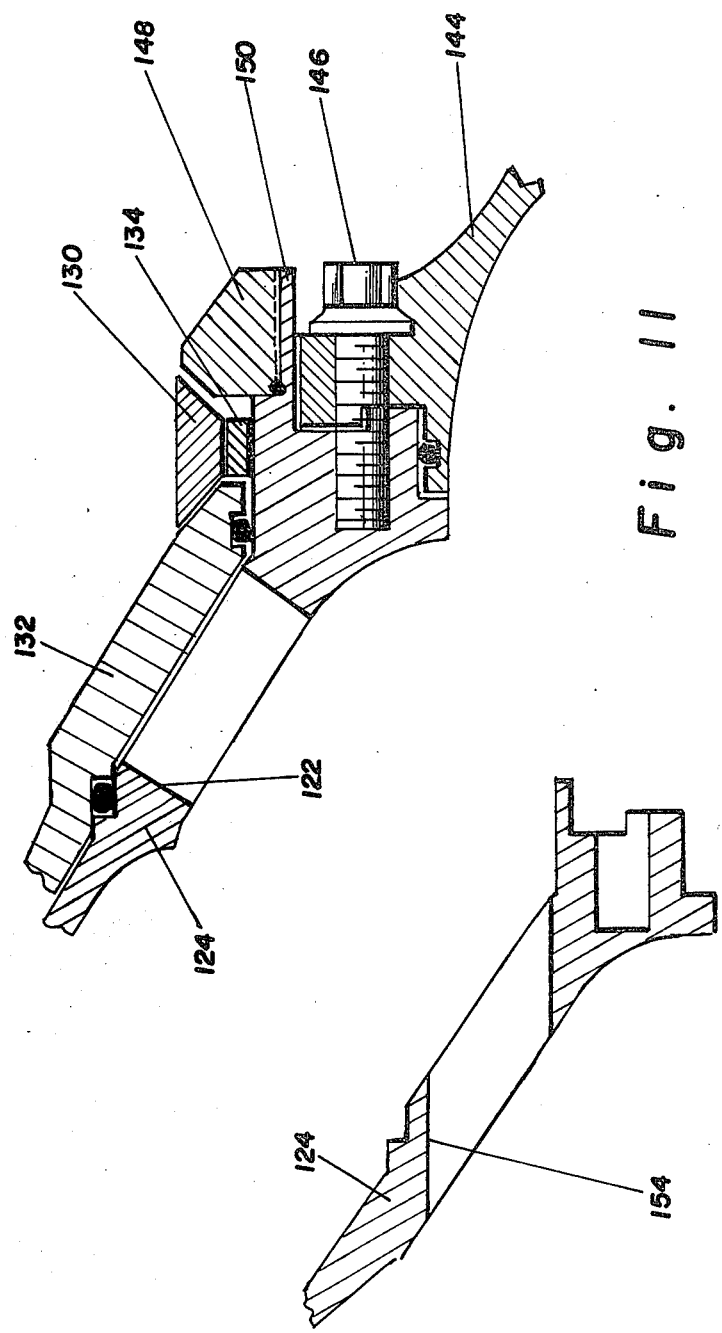

THRUST REVERSAL SYSTEM

BACKGROUND OF THE INVENTION

1. Field of the Invention

This invention relates to rocket motors and particularly to a system for reducing, neutralizing and/or reversing the thrust vector resultant of an operating solid propellant rocket motor.

2. Description of the Prior Art

Solid propellant rocket motors consist, in principal parts, of a combustion chamber within which the propellant is stored prior to ignition, and one or more nozzles through which hot gases exhaust during combustion of the propellant. The rate of gas generation during motor operation is determined by the chemical characteristics of the propellant, the surface area history of the propellant charge as it is consumed, and the pressure within the combustion chamber. The pressure is strongly affected by the flow characteristics of the exhaust gas stream. Normally, in order to maximize the thrust generated by the stream, the total flow area at the nozzle throat is proportioned to assure supersonic flow of the stream farther out.

The thrust generated by the hot gas stream exhausting from the rocket motor, used to propel a satellite, a ballistic missile, or some other payload, normally continues until substantially all of the propellant is consumed and combustion stops. Termination and reversal of the thrust vector resultant prior to this time in the combustion history has been extremely difficult.

For satellite applications, when launch point and desired altitude are determined in advance, this difficulty is not of major consequence except in lower stages of a multistage system, where stage separation must be accomplished. If the lower stage continues to be propulsive prior to ignition of the next stage, collision can occur. Similarly in weapon system applications, the difficulty is important when the nature of the mission requires separation of the rocket motor from the payload prior to its encounter with the target, particularly when the weapon must be useful for targets near and far within the range of the system. For such weapon systems, thrust management prior to completion of burn of the propellant charge is an essential feature.

Thrust termination has been accomplished in the prior art by greatly enlarging the exhaust area available for outflow of gases generated in the combustion chamber. To this end, mechanical means for release of the rocket motor nozzle, and explosive features to cut holes in the combustion chamber, have been devised. Their effect is to diminish the combustion chamber Pressure below the level necessary for sustained combustion.

Sometimes termination alone is not enough. When separation and termination are accomplished where atmospheric drag slows the payload after separation from the rocket motor and the payload shields the motor from some of the drag, collision can still occur. Preventative measures have included separate thrusters, small rocket motors mounted on the forward end of the main motor to create an aftward thrust after the end of main motor burn; there have also been devices to create additional exhaust openings at the forward end of the main motor before or after completion of its burn. For both of these approaches, an opportunity is created that hot gases exhausted in a forward direction will damage the payload.

Proposals of techniques for thrust reversal and/or neutralization using aft end features of the rocket motor have been nearly as rare as their application. One such proposal is disclosed in U.S. Pat. No. 3,177,655 granted on Apr. 13, 1965 to Roger F. White wherein circumferentially arranged ports in the combustion chamber wall of a solid propellant rocket motor are closed by a slide or cover having a forwardly curved deflector portion, which cover normally is retained in the port closing position by a segmented metal band clamp but is releasable by the activation of explosive bolts. When released, the cover slides aft until it engages a stop on the exit cone outer surface thereby uncovering the ports. This results in a diversion of some of the combustion gases outwardly through the ports. The outward flow of combustion gases through the ports is directed by the cover deflector portion forwardly of the rocket motor and provides brief thrust in the reverse direction in opposition to the primary motor thrust until the combustion chamber pressure is reduced sufficiently to cause termination of combustion of the propellant.

U.S. Pat. No. 3,196,610 granted on July 27, 1965 to Frank P. Anderson discloses a rocket motor nozzle arrangement for producing a thrust in opposition to the motor primary forward thrust comprising auxiliary forwardly curved nozzles that are connected to the combustion chamber, each nozzle being normally closed by a rupturable diaphragm. Rupturing of the diaphragms initiates the opposing thrust.

It is desirable in the operation of some solid propellant rocket motors to have the ability to rapidly terminate the forward thrust, and additionally, to produce a net reverse or negative thrust. Failure to terminate the forward velocity rapidly enough may cause a missile to miss the target. For example, upon separation of the rocket motor from its missile payload, which may be a warhead, it is desirable not only to terminate the forward thrust but also to produce a net reverse or negative thrust, that is, to reverse the thrust vector resultant.

It is further desirable in the operation of a solid propellant rocket motor to have the ability to predetermine the amount of reverse thrust and the time required to reach a reverse or negative thrust vector resultant thereby to provide a reduction, neutralization, or reversal of the thrust vector resultant, as desired.

SUMMARY OF THE INVENTION

A general object of the invention is to provide a system that is mounted on the aft dome of a rocket motor case for reducing, neutralizing and/or reversing the thrust vector resultant of an operating solid propellant rocket motor.

Another object of the invention is to provide in association with such a system a means to determine the amount and duration of reverse thrust and the time required to reach a reverse or negative thrust vector resultant.

A further object of the invention is to provide such a thrust reversal system that is characterized in that combustion does not stop and motor burn continues until all of the propellant is consumed thereby maintaining for a longer Period the thrust reversal effect.

A still further object of the invention is to provide a means of readily and predictably controlling the velocity of system components which move during operation, relative to other portions of the rocket motor, so that forces required to be applied to halt the relative motion are tolerably small.

Additional objects of the invention are to provide all these features without extensive additions of inert structural weight to the rocket motor, without substantial increases of atmospheric drag during flight of the motor, and without undue compromises of operational reliability of the rocket motor.

In accomplishing these and other objectives of the invention, there is provided a movable piston or plenum cover that fits over a plurality of small outlet ports that are arranged in a circumferential band around the aft dome of the rocket motor case. Before actuation, the cover seals the band of ports using a single seal feature forward and another aftward of the band. After actuation by means of a command transmitted from on-board or remote guidance, the piston cover retracts aftward a pre-set distance to uncover the ports, forming a plenum chamber and becoming a baffle, in effect, a reverse thrust nozzle, which directs the combustion chamber gas flow exiting the ports outward and forward. The aftward thrust vector resultant of this gas flow when added to the forward thrust vector resultant of gas flow through the main nozzle of the motor, may be made to reduce, neutralize and/or reverse the total thrust of the motor.

The piston cover stroke length in uncovering the ports establishes not only the time required to reach reverse or negative thrust, but also the location and area of the effective throat of the reverse thrust nozzle, where the transition from subsonic velocity to supersonic velocity gas flow occurs. With the effective throat outboard or downstream of the band of ports, the changes of gas flow direction occur at subsonic velocities at which friction and change in momentum of the gases effect the smallest losses. The effective throat location is also affected by the size and number of ports in the band. When the rocket motor case aft dome is of conical external configuration, even when the separation between forward and aft plenum surfaces is of constant width, the flow area increases forward of the throat location with radial position due to the increasing circumference. These factors are important not only as means of prediction, optimization, and control of the reversal system behavior, but also as means of assurance against premature termination of burn of the propellant charge.

Suitable control of piston cover shock loadings and stroke time may be effected by the use of hydraulic or mechanical shock absorbers, the type of shock absorber employed being determined by the requirements of the particular thrust reversal system installation.

BRIEF DESCRIPTION OF THE DRAWINGS

Other objects and advantages of the invention will become apparent as the following description is read with reference to the accompanying drawings wherein:

FIGS. 10–13 are detailed fragmentary sectional views of further embodiments of the thrust reversal system according to the invention.

DESCRIPTION OF THE PREFERRED EMBODIMENTS

Figure 1:
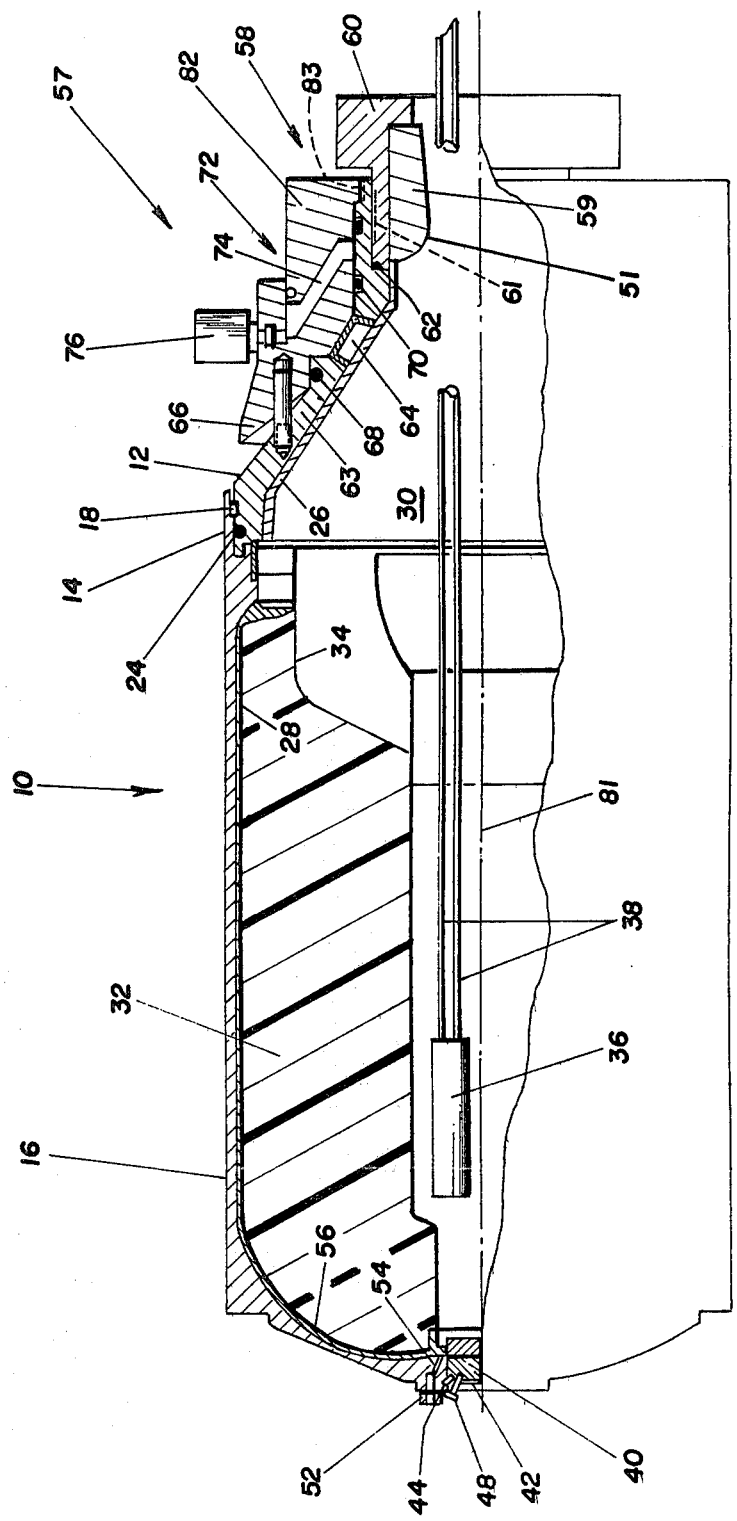
FIG. 1 is a partial sectional view taken along the longitudinal axis of a rocket motor utilizing a first, heavy-weight, embodiment of the invention.

Referring to the drawings wherein like parts are designated by the same reference numerals, the numeral 10 in FIG. 1 designates a solid propellant rocket motor in the aft section of which the thrust reversal system of the invention is embodied.

Figure 2:
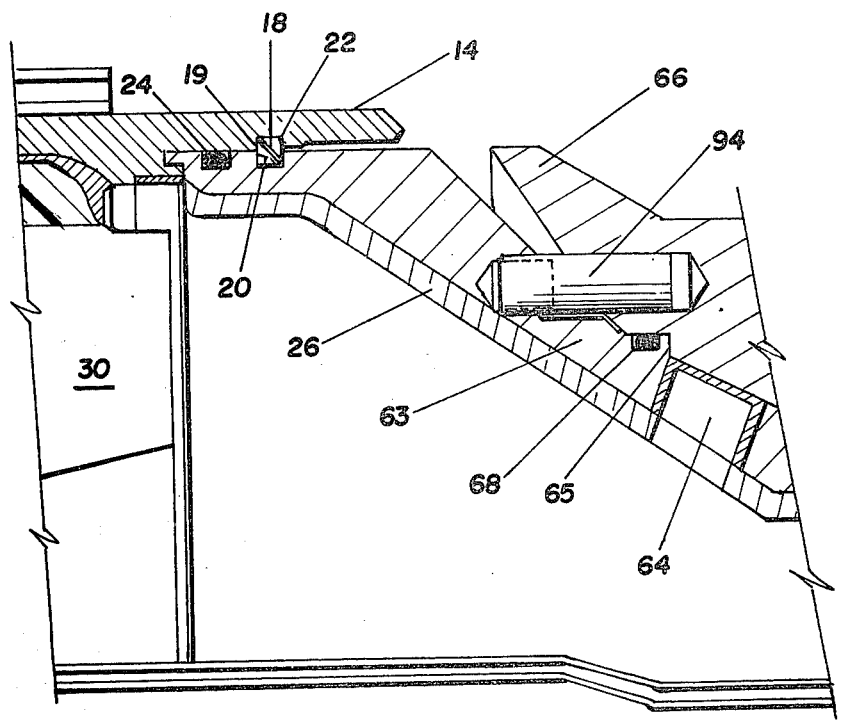
FIG. 2 is a detailed fragmentary sectional view illustrating the manner of attachment of the aft dome to the case assembly of the rocket motor of FIG. 1.

Rocket motor 10 may be of a conventional type having a removable separate conical insulated aft dome 12 that is secured to the aft end of a cylindrical section 14 of a steel case 16, as by a lockwire 18. Lockwire 18, as best seen in FIG. 2, is positioned in a space 19 provided between an outer circumferential groove 20 that is located adjacent the forward end of conical aft dome 12 and an opposing inner circumferential groove 22 that is located adjacent the overlapping aft end of cylindrical section 14. In a manner known in the art, lockwire 18 is introduced into the space 19 through an entrance slot, not shown. The entrance slot desirably is covered with a suitable long piece of tape after the lockwire 18 has been installed. Prior to assembly, the lockwire 18 and the grooves 20 and 22 preferably are lubricated with a suitable lubricant, in this instance consisting of equal parts by volume of castor oil and molybdenum disulfide powder. A gland seal of configuration well known in the art, using a pre-formed rubber O-ring 24, is provided to prohibit gas flow through the connection of aft dome 12 and section 14.

A molded insert 26 of insulating material is bonded to the inner surface of aft dome 12 and forms a continuation of an aft rubber insulation and relief boot indicated at 28 that is bonded in conventional manner to the inner surface of the aft end of cylindrical section 14 of the case 16 of the rocket motor 10.

Positioned within the steel case 16 is a hollow case-bonded finocyl propellant grain configuration 32 having an enlarged cavity 34 at the aft end thereof. The hollow central cylindrical cavity within the propellant grain 32, the empty spaces 34 in the fin region, and the cavity farther aft bounded by the molded insulator 26, together comprise a combustion chamber 30. Suitably positioned within the combustion chamber 30, adjacent the forward end thereof, are two pyrotechnic igniters, one such igniter only, indicated at 36, being shown. The igniters are connected by electrical conducting wires shown at 38 running through the nozzle throat 51 to a source of electrical energizing current, not shown. The absence of positive attachments between the ignition devices and components of the rocket motor is an experimental convenience in the first embodiment of the invention.

Figure 5:
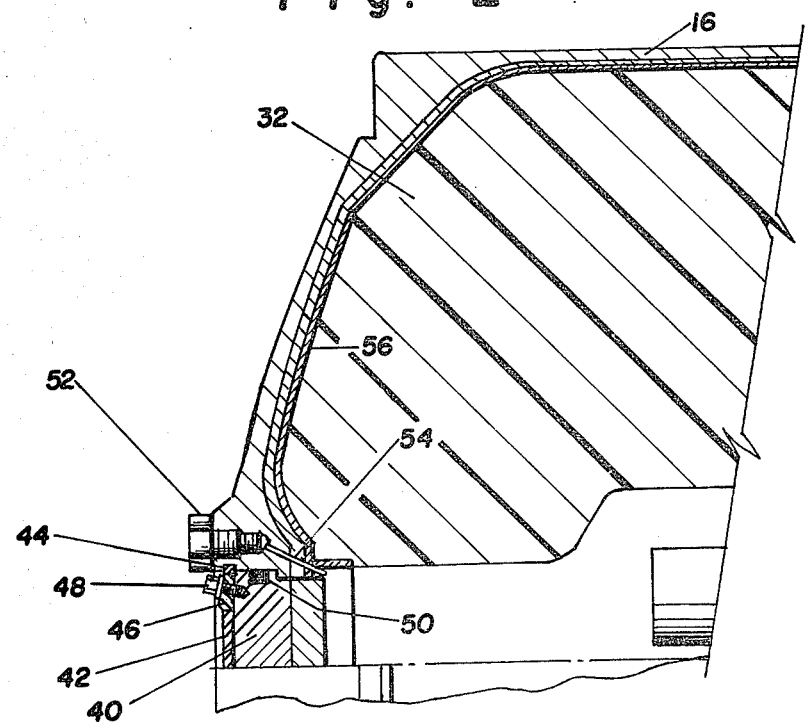
FIG. 5 is a detailed fragmentary sectional view of the forward end of the rocket motor of FIG. 1.

At the forward or head end of motor case 16 is an insulated plug 40, as is best seen in FIG. 5. A retaining ring 42 cooperates with an inner groove 44 provided in an opening in the forward end of case 16 to hold the plug 40 in place, the retaining ring 42, in turn, being secured by a retainer 46 that is held in place by a socket head screw and washer indicated at 48. An O-ring seal 50 prohibits gas flow through the connection between plug 40 and case 16, in a manner analogous to the gland seal at the connection at the aft end. Alternative configurations of plug 40 would provide for mechanical and electrical attachment of the ignition system. A plug indicated at 52 is provided to seal a narrow passage 54, comprising a tap for the measurement of combustion chamber pressure, in the forward end of case 16. A head end rubber insulation and relief boot 56 is bonded to the inner forward surface of case 16.

Figure 3:
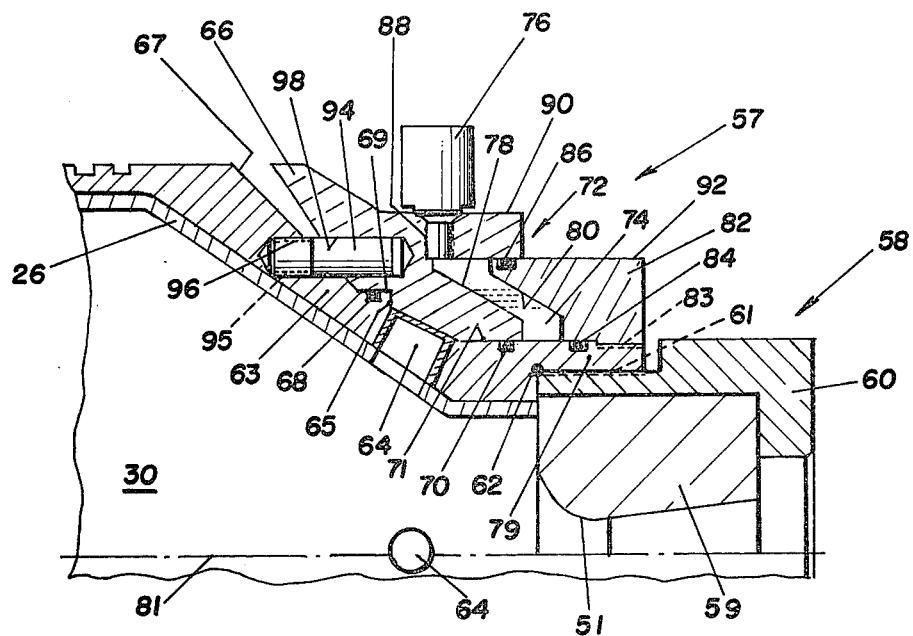
FIG. 3 is a detailed fragmentary sectional view of the heavy-weight thrust reversal/nozzle assembly of the rocket motor of FIG. 1, in battery position, before actuation.
Figure 4:
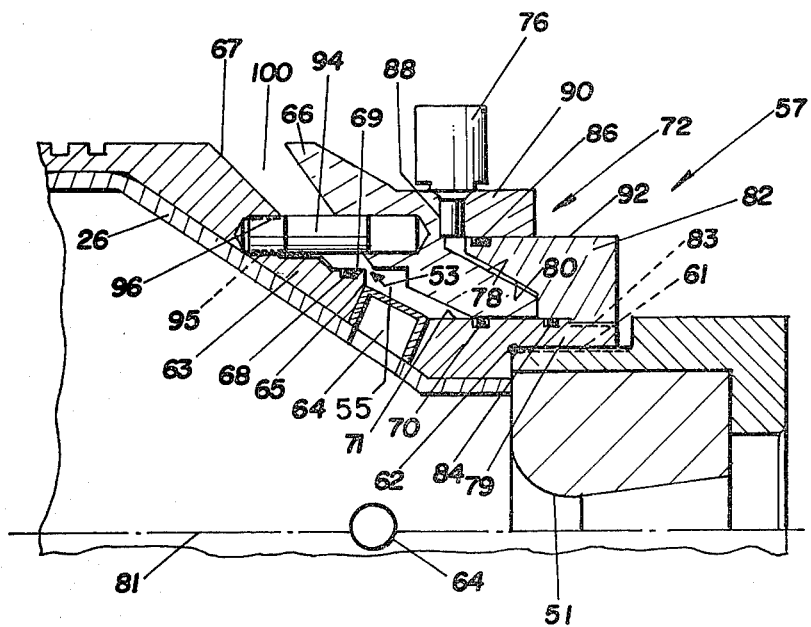
FIG. 4 is a detailed fragmentary sectional view of the thrust reversal/nozzle assembly of the rocket motor of FIG. 1, in position after actuation.

At the aft end of conical aft dome 12, as seen in FIGS. 1, 3 and 4 is a thrust reversal system 57 and a nozzle assembly 58. Assembly 58 includes a main or central motor nozzle 59 with converging and diverging regions forward and aft of the throat 51. Nozzle 59 is retained in position by an annular aft closure member 60. Cooperating screw threads indicated at 61 are provided internally of aft dome 12 and externally of member 60 for engagement of and locking of these components together with the nozzle 59 in between. Desirably, an O-ring seal 62 may be provided between aft dome 12 and aft closure member 60, as shown, grease being applied to the O-ring seal 62 prior to assembly.

The aft thrust reversal system 57 according to the first embodiment of the invention, as best seen in FIGS. 3 and 4, comprises: (1) a plurality, for example, four, of circumferentially arranged insulated outlet holes or ports 64 in a conical internally insulated wall 63 of aft dome 12, two such insulated ports 64 only being shown in the drawings, one in dotted lines the axis of each of the ports 64 being perpendicular to the wall of aft dome 12; (2) a piston or plenum cover 66 of conical configuration which fits over the ports 64, the shape of a substantial portion of the forward side of cover 66 complementing that of an irregularly shaped adjacent outer surface portion 65 of wall 63 of dome 12, and being sealed against cylindrical outer surface portions 69 and 71 of wall 63 by a forward O-ring seal 68 and an aft O-ring seal 70, respectively; (3) a hydraulic shock absorber indicated at 72 comprising a hydraulic chamber 74 of generally conical configuration that is filled with oil, grease or paste; and (4) a solenoid operated valve 76.

The forward side of conical chamber 74, as illustrated in FIG. 3 is defined by an aft generally conical surface 78 of cover 66. The aft side of chamber 74 is defined by a forward generally conical surface 80 of an aft stop 82 of annular or ring form that is mounted on an aft extension 79 of dome 12, the angles of surfaces 78 and 80 with respect to the longitudinal axis 81 of rocket motor 10 being essentially the same. Internal screw threads 83 on stop 82 cooperate with external screw threads on the aft end of conical aft dome 12 for engagement of and locking of these members together, an O-ring 84 being provided for sealing the aft lower side of chamber 74, the forward lower side of chamber 74 being sealed by the O-ring 70. The upper side of chamber 74 is sealed by an aft cylindrical extension 90 of cover 66 and by an O-ring 86. Valve 76 is mounted on extension 90 and controls the discharge of fluid from chamber 74 through a hydraulic fluid control orifice or opening 88 that is provided in extension 90. Extension 90, as shown, extends over the external cylindrical surface 92 of stop 82, the O-ring 86 providing sealing engagement therewith. Desirably, grease is applied to the O-ring seals 68, 70, 84 and 86 prior to assembly.

Piston cover 66 is movable in the aft direction with respect to the conical aft end 12 of rocket motor 10 from the position shown in FIG. 3 to a position as illustrated in FIG. 4 upon actuation of valve 76 and subsequent flow of fluid through orifice 88 from chamber 74. For guiding such movement of cover 76, a plurality of guide pins 94, for example, four, may be provided in a circumferential band around the conical aft dome 12, equidistant from each other about the longitudinal axis 81 of motor 10, one such guide pin 94 only being shown in the drawings. Cooperating screw threads indicated at 95 on the forward end of each guide pin 94 and in an associated recess 96 in the conical wall 63 of aft dome 12 serve to hold the guide pins 94 in place. The other end of each guide pin 94 extends into an associated elongated recess 98 in the adjacent wall of piston cover 66. The length of each guide pin 94 is sufficient to allow a desired range of movement aft of cover 66 while maintaining the desired guiding action. Movement aft of the cover 66 is produced by pressure in the combustion chamber 30 upon actuation of solenoid valve 76.

The feasibility of the thrust reversal concept according to the present invention was successfully demonstrated by actuating a subscale, heavy weight thrust reversal/nozzle assembly, as illustrated in FIGS. 1, 3 and 4, on a rocket motor to generate reversal thrust.

The test rocket motor utilized a 13.5-inch diameter (34.29 cm.) loaded case 16 containing 144 pounds of a 20-percent aluminum, 88-percent solids HTPB (TP-H-3398) propellant. A thrust reversal nozzle assembly as shown and described with reference to FIGS. 3 and 4 was fabricated and assembled to the rocket motor case. Two standard pyrotechnic test igniters were used.

The thrust reversal/nozzle assembly 57, as shown in FIGS. 3 and 4, consisted of an insulated aft closure 12, stop 82, piston cover 66, nozzle assembly 58, and a hydraulic shock absorber 72.

In the battery position of the test thrust reversal/nozzle assembly 57, the piston cover 66 is forward. In this position, the joint between the piston and aft closure 12 is sealed by O-rings 68 and 70, and all combustion gases are directed aft through the nozzle 59. The piston cover 66 is held in the forward position by fluid in the sealed chamber 74 between the piston cover 66 and the stop 82.

Upon thrust reversal command, the solenoid valve 76 in the hydraulic fluid dump line opens, allowing the fluid to be expelled through control orifice 88. Pressure in combustion chamber 30 forces the piston cover 66 to move aft at a rate controlled by the expulsion of the fluid. After approximately 0.38 inch (0.9652 cm.) of movement in this embodiment, the forward O-ring seal 68 is cleared; at 0.56 inch (1.4224 cm.) the piston cover 66 clears the aft closure 12, and at 0.63 inch (1.6002 cm.) the thrust reversal system throat 53 is fully open, the aft O-ring 70 remaining sealed.

After the forward O-ring seal 68 is cleared, the thrust reversal system throat area increases, causing a rapid decrease in pressure in the chamber 30 with resulting reduction in forward thrust from the main or central nozzle 59. Also, reverse thrust is produced by the axial component of forces generated by gases exhausting forward and outward through an annular plenum chamber 55, throat 53 and divergent region 100 between the piston cover 66 and the aft closure 12. The throat 53, as seen in FIG. 4, is located downstream of the circumferential band of ports 64, the total area of the ports 64 being greater than the total area of the throat 53, whereby the changes in gas flow direction occur at subsonic velocities. This reverse thrust, coupled with the reduced forward thrust from the main nozzle 59, results in rapid reduction in the net forward thrust, and finally a net reverse thrust.

The test rocket motor unit demonstrated the actuation concept of translating a conical cover, or piston, 66 aft to open reversal throat 53 and to direct combustion gases forward. However, because of the short length of the only piece of steel that was available for the aft closure or dome 12, the exit angle for the thrust reversal feature, between conical surface 67 and the longitudinal axis 81 of the motor, was made larger than desired, specifically 45° instead of the desired 25°. Additionally, the test unit was not optimized for solenoid valve 76 orifice area, in order that available components might be used. These factors had the effect of reducing the magnitude of the axial component of reversal thrust so that, when summed with the thrust of the main motor nozzle 59, the net thrust, or thrust vector resultant, reached zero only after one-half second, after which it continued to decay to a negative or net reverse thrust. Hence, the test unit significantly reduced forward thrust immediately upon command but did not immediately generate a net reverse thrust.

Figure 6:
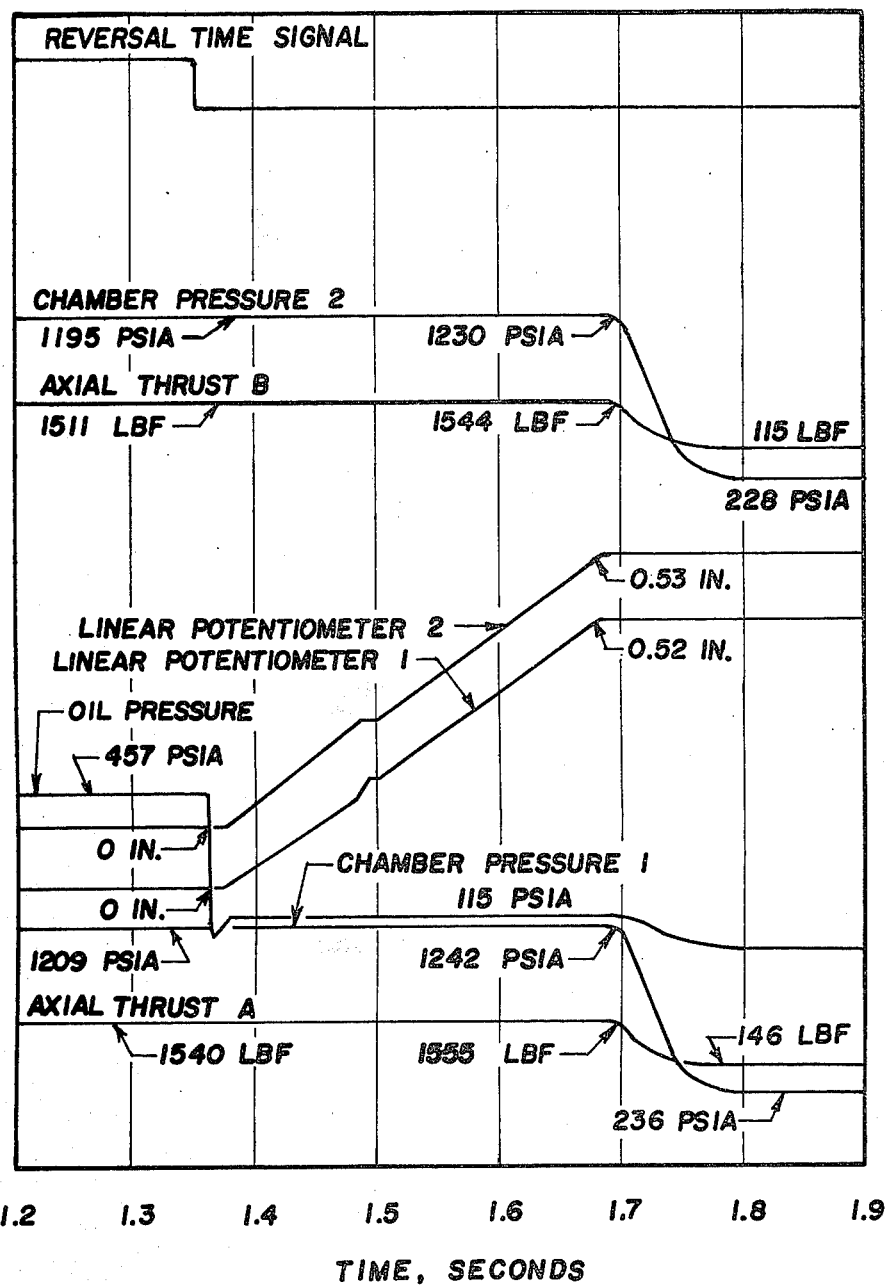
FIG. 6 is a graphical representation illustrating the thrust reversal demonstration test sequence of a tested embodiment of the invention.
Figure 7:
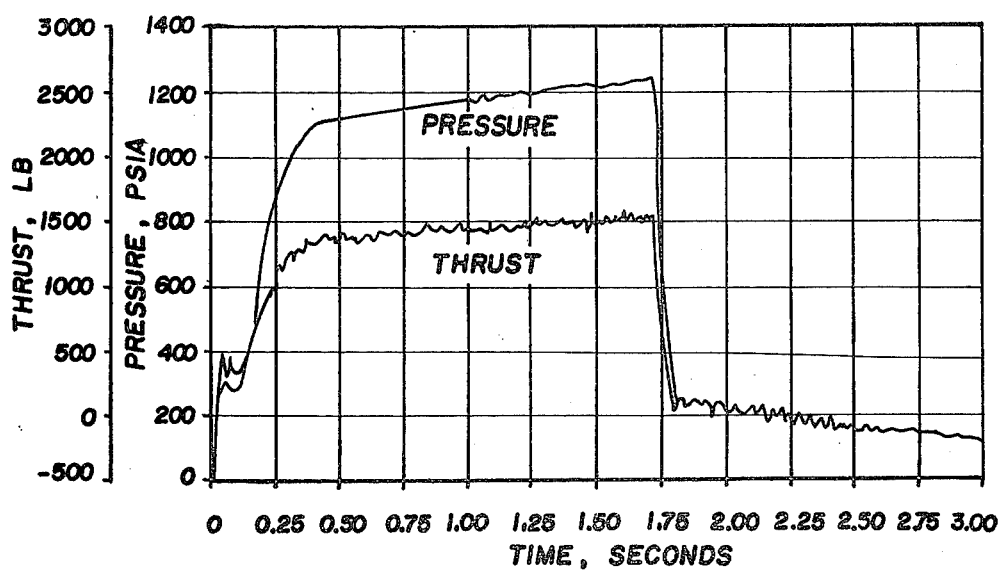
FIG. 7 is a graphical representation showing thrust reversal demonstration data of the tested embodiment of the invention.

The test rocket motor unit was mounted in a test stand, not shown, and suitable instrumentation was applied to supply the data provided in the graphs of FIGS. 6 and 7, the data Provided in FIG. 6 being redundant since duplicate instrumentation was provided to guard against failure of instrumentation components. Specifically, the curves designated "AXIAL THRUST A," "CHAMBER PRESSURE 1," and "LINEAR POTENTIOMETER 1"comprise a first set of data, and the curves designated "AXIAL THRUST B," "CHAMBER PRESSURE 2," and "LINEAR POTENTIOMETER 2" comprise a second set of data, the hydraulic "OIL PRESSURE" being common to both sets of data.

Operation of the test rocket motor was initiated by the application of firing current to the squibs in the dual pyrotechnic igniters 36. The propellant 32 ignited and burned at 1200 psia, as planned. At 1.35 seconds following the initiation of burning, the thrust reversal command was given. This data and the sequence of events that followed are given in FIG. 6. Ten milliseconds later oil pressure decay is seen, indicating opening of the solenoid valve 76. Ten milliseconds after the start of the hydraulic fluid pressure decay, potentiometer data show the start of movement of piston cover 66. The piston cover 66 stroked aft at essentially a constant velocity. When the piston cover 66 had stroked 0.54 inch (330 milliseconds after the start of piston motion), rapid decreases in pressure in chamber 30 and axial thrust were recorded. This result confirms that the throat 53 formed and combustion gas flowed out through it.

As shown in FIG. 7 at a larger time scale, within 70 milliseconds of start of thrust decay, the thrust reduced from 1550 pounds to approximately 120 pounds. The thrust continued to decay at a lesser rate and passed through zero approximately $\frac{1}{2}$ second after the start of thrust decay. After that point the thrust continued to decay to negative or net reverse thrust. The reversal system hardware continued to operate for over 3 seconds before erosion of the aft closure around the reversal ports 64 and throat 53 affected reverse thrust.

The graphical representation of FIG. 7 shows that reverse thrust was achieved. The time to reach negative thrust was longer than may be desired in some tactical uses since the piston cover 66 stroke time was controlled at $\frac{1}{2}$ second. This time can be reduced, in accordance with the invention, by increasing the size of the hydraulic fluid control orifice 88 or by combining an interval of unrestrained motion of the piston cover 66 with a shock absorbing feature at the end of its path, an embodiment described hereinafter. The number, size and orientation of the ports 64 and the stroke length of the cover 66 may be pre-set to provide a desired mass flow characteristic in the plenum chamber 55. The amount of reverse thrust can be increased by optimizing the reversal throat area and the reversal nozzle angle, as described hereinafter.

Figure 8:
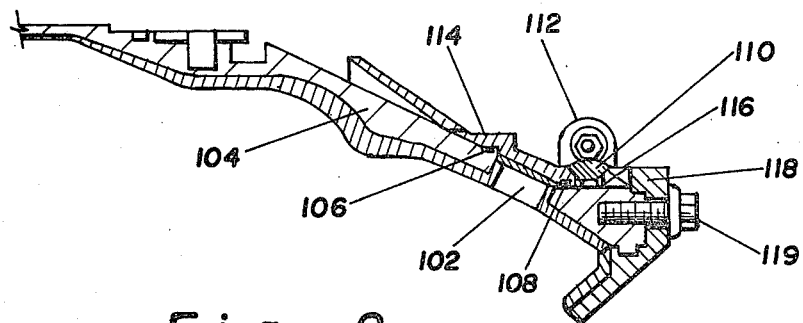
FIG. 8 is a detailed fragmentary sectional view of another embodiment of the invention, before actuation, a flight arrangement optimized for port area, for gas deflection angle, reversal plenum chamber, and for high rate of opening of reversal ports.
Figure 9:
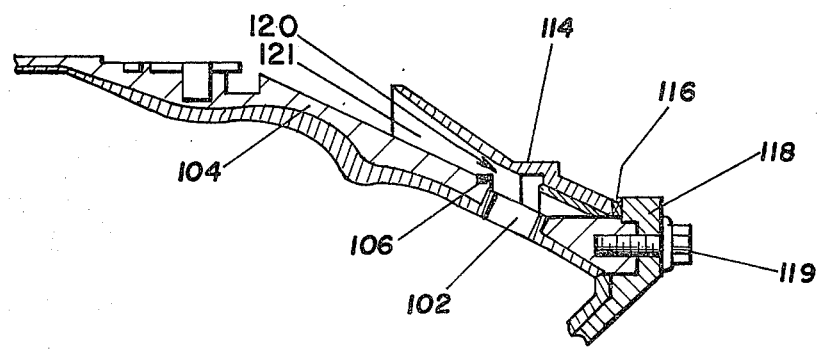
FIG. 9 is a detailed fragmentary sectional view of the thrust reversal system of FIG. 8, after actuation.

FIGS. 8 and 9 illustrate another embodiment of the aft-end thrust reversal system of the present invention. FIG. 8 shows the relationship of the several components of the thrust reversal system of this embodiment before actuation, FIG. 9 after actuation.

By reference to FIG. 8, it will be seen that this embodiment of the thrust reversal system consists of:

(1) a plurality of small circular insulated ports, in this instance 16 in number, only one, designated 102, of which is shown, arranged in a circumferential band about the insulated conical aft dome 104 of a rocket motor case, shown only in part, the angle of the outer surface of aft dome 104 with respect to the horizontal axis 81 being 25° in this embodiment; (2) two O-rings, one a forward O-ring seal 106 and the other an aft O-ring seal 108; (3) a two-segment clamping wedge or ring 110 held together by redundant explosive bolts 112; and (4) a conical piston cover 114 for the ports 102, the cover 114 being sealed with a mechanical high rate stroke shock absorber 116 between the clamping ring 110 and a motor aft closure 118, which is attached to the aft dome in this embodiment by bolts 119. The shock absorber 116 may comprise crushable soft aluminum or any other suitable high rate stroke shock material.

During the early portion of motor burn, the piston cover 114 is held at its forward-most position by the two-segment clamping ring 110. The axial component of force applied to the piston cover 114 by the pressure of gases in the combustion chamber is transmitted by the clamping ring 110 either directly or through the shock absorber 116 to a radially outward extension of the closure 118. When the explosive bolts 112 are actuated to release the clamping ring 110, the pressure of the rocket motor combustion chamber drives the conical piston cover 114 aft against the crushable shock absorber 116 and aft closure 118. Gas flows through the ports 102, impinges on the cover 114, turns forward and exits through the plenum chamber, the annular throat 120 and the divergent region 121 formed between the aft dome 104 of motor case and the cover 114 being downstream of the circumferential band of ports 102, the total area of the throat 120 being less than the total area of the ports 102 whereby the change in gas flow direction occurs at subsonic velocity. This creates greater reverse thrust than the forward thrust from the main or central motor nozzle, not shown. The reverse thrust coupled with the reduced forward thrust resulting from the concomitant reduction in combustion chamber pressure rapidly results in the production of a significant net negative or reverse thrust.

FIGS. 10, 11, 12 and 13 illustrate further embodiments of the thrust reversal system according to the present invention.

Figure 10:
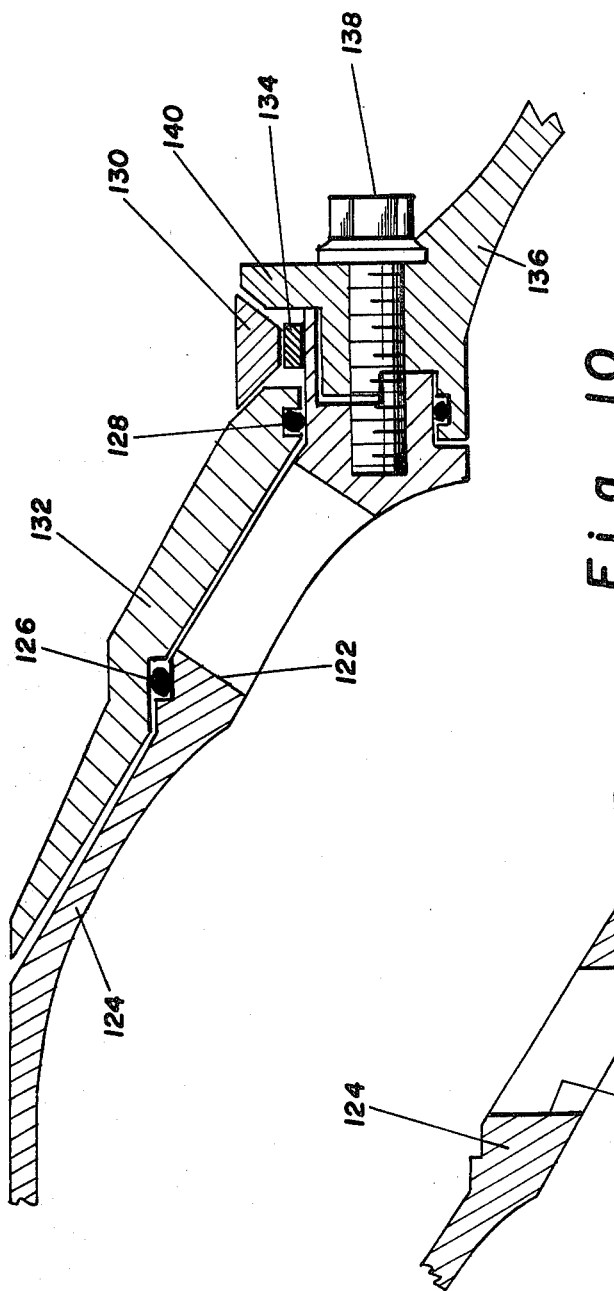

The embodiment of the thrust reversal system of FIG. 10 consists of: (1) a plurality of small insulated ports 122 that are arranged in a circumferential band around the insulated conical aft dome 124 of a rocket motor case, not shown, but which may be similar to the case 16 of FIG. 1, the angle of the surface of aft dome 124 with respect to the longitudinal axis of the motor being substantially less than 45°, the axis of each of the ports being perpendicular to the wall of aft dome 124; (2) two O-rings, one a forward O-ring seal 126 and the other an aft O-ring seal 128; (3) a wedge strip or clamping ring 130 with explosive bolts, not shown, two places around its circumference; (4) a conical piston or plenum cover 132 for the ports 122, a crushable shock absorber 134 such as soft aluminum being provided in the annular space between wedge strip or ring 130 and the adjacent outer circumferential surface of aft dome 124; and (5) an aft closure 136 for the aft dome 124, closure 136 being attached to the end of aft dome 124 by closure attach bolts 138. Instead of being attached to the motor case aft dome 124 by attach bolts 138, the aft closure may be threaded to an extension of the aft dome 124, if desired, in the manner in which stop 82 is attached to aft dome 12 in FIG. 1.

During the early portion of motor burn, the cover 132 is held at its forward-most position by the wedge strip 130 which, in turn bears against a stop 140 comprising a circumferential extension or flange on the aft closure 136. The wedge strip 130 is segmented, adjacent segments being held together with explosive bolts which carry hoop force in the ring. When the explosive bolts are actuated, the wedge strip 130 is expelled by the outward radial component of the bearing forces at its forward and aft surfaces. Immediately following that the cover 132 translates aft until it is stopped by a circumferential flange 140 formed on aft closure 136, the stroke time aft being determined by the crushing of the shock absorber 134. A plenum chamber and downstream throat are thus formed between the internal surface of the cover 132 and the outer surface of the aft dome 124, through which combustion chamber gas flows outward and forward, the total area of the throat being less than the total area of the ports 122. As in the embodiments of the invention previously described, this creates a reverse thrust. Whether this reverse thrust is less than that produced by the main motor nozzle, the same or greater depends upon the characteristics of the crushable aluminum in the shock absorber, and hence, the stroke time, and the reversal nozzle angle.

FIG. 11 illustrates a modification of the aft-end thrust reversal system of FIG. 10 wherein an alternative to the circumferential extension or flange 140 on the aft closure 136 for stopping the movement aft of the cover 132 is provided. This alternative eliminates the use of the closure attach bolts of FIG. 10 to absorb shock load at piston or plenum cover impact.

In FIG. 11, aft closure 144 is attached to aft dome 124 by closure attach bolts 146, the aft closure having no flange. For effecting the function of stopping the translation aft of the piston cover 132 and supporting the cover 132 in its aft position, there is provided an internally threaded ring 148 that is threaded to an extension 150 of the aft dome 124.

Figure 12:
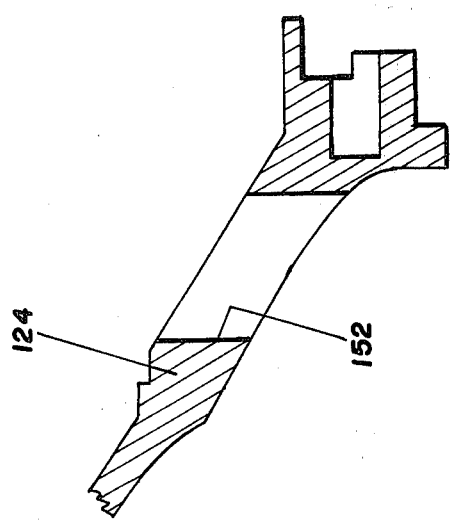

FIG. 12 illustrates a further modification of the aftend thrust reversal system of FIG. 10 which involves the use of more ports, indicated at 152, that are arranged in a circumferential band around the aft dome 124, each of the ports 152 being smaller and disposed with its axis perpendicular to the longitudinal axis of the rocket motor. This modified form of the invention improves flow conditions for the thrust reversal gas.

FIG. 13 illustrates another modification of the aftend thrust reversal system of FIG. 12 which, again, involves the use of more ports, indicated at 154, that are arranged in a circumferential band around the aft dome 124, each of the ports 154 being smaller and disposed with its axis parallel to the motor longitudinal axis. This arrangement allows the motor ignition system to be mounted on the plenum cover.

Thus there has been provided according to the invention a thrust reversal system for reducing the thrust vector resultant of a solid propellant rocket motor. The invention utilizes an actuatable conical piston or plenum cover that fits over a plurality of small ports that are arranged in a circumferential band around the aft dome of the motor. Prior to actuation, the cover seals the ports to permit normal operating pressure within the combustion chamber of the motor. After actuation, the cover is moved aft a preset distance, abutting against a stopping feature, in response to the combustion chamber pressure, thereby uncovering the ports and becoming a baffle which directs the combustion gases exiting the ports outward and forward. As the reversal system throat opens, the total throat area of the motor increases, causing a rapid decrease in combustion chamber pressure with resulting reduction in forward thrust from the main, central nozzle of the motor, the decrease in combustion chamber pressure, however, not being so great as to stop motor burn. Reverse thrust is produced by the gases exhausting forward through the annular plenum chamber and throat between the piston cover and the aft closure. The reverse thrust, coupled with the reduced forward thrust from the central nozzle, results in rapid reduction in the net forward thrust, and finally, in a net reverse thrust.

Suitable control of gas flow characteristics may be exercised by the setting of the travel or stroke distance of the piston cover and the number, size and orientation of the circumferentially arranged ports. Thus, the amount of reverse thrust may be predetermined in accordance with the degree of optimization of the reversal port area and the reversal nozzle angle, that is, the angle between the aft dome and the longitudinal axis of the motor. Optimization of the reversal port area, the reversal throat area, and the nozzle angle result in an increase in the reverse thrust.

The time to reach negative thrust vector resultant is affected by the stroke time of the piston cover. Thus, the time to reach net negative thrust may be reduced by reducing the piston cover stroke time, as by increasing the size of the hydraulic fluid control orifice employed in the first described invention embodiment of FIGS. 1–7 or by the use of high rate stroke shock absorber as in the flight weight arrangement of FIGS. 8 and 9.

The degree of optimization of the reversal port area, the reversal nozzle angle, and the time to reach negative thrust are determined by the net thrust that is required, the flight trajectory and characteristics, and other factors involved in a particular flight and application as known by the rocket engineer.

What is claimed is:

1. A thrust reversal system for a rocket motor having a wall defining a combustion chamber, a portion of said wall forming a conical rocket motor aft dome having a central nozzle formed therein, a plurality of outlet ports formed in a circumferential band in the wall of the aft dome, each of said ports communicating exteriorly of the combustion chamber, a piston cover mounted on the motor and normally held in a first position against the aft dome to seal said ports to permit normal operating combustion pressure within the combustion chamber, said cover being movable to a second position to uncover said ports, stop means formed on the rocket motor to limit the extent of movement of said cover, releasable means normally retaining said cover in said first position, said cover, when released by said releasable means, being moved to said second position by pressure in said combustion chamber, and means to regulate the rate of deployment of said cover from said first position to said second position.

2. A thrust reversal system as specified in claim 1 wherein the angle of the forward surface of said cover with respect to the horizontal axis of the motor is substantially the same as the angle of the surface of the conical aft dome over an area thereof in which said ports are formed whereby, upon movement of said cover from said first to said second position, a generally annular conical plenum chamber is formed into which flow gases exiting said ports, the gas flow area increasing with radial position of the forward surface of said cover with respect to said ports.

3. A thrust reversal system as specified in claim 2 wherein said piston cover, in uncovering said ports, forms in cooperation with said conical aft dome a reverse thrust nozzle having an effective throat through which gases from said plenum chamber flow, the length of the stroke of said Piston cover in uncovering said ports establishing the time required to reach reverse thrust and the location and area of said effective throat where the transition from subsonic to supersonic gas flow occurs.

4. A thrust reversal system as specified in claim 3 wherein the rocket motor has a longitudinal axis that passes centrally of the conical aft dome and the central nozzle and wherein the angle of the conical aft dome with respect to the longitudinal axis is about 25°.

5. A thrust reversal system as specified in claim 3 wherein each of said ports is formed in the wall of the conical aft dome with its axis perpendicular to the wall of the conical aft dome.

6. A thrust reversal system as specified in claim 3 wherein each of said ports is formed in the wall of the conical aft dome with its axis perpendicular to the longitudinal axis of the motor.

7. A thrust reversal system as specified in claim 3 wherein each of said ports is formed in the wall of the conical aft dome with its axis parallel to the longitudinal axis of the motor.

8. A thrust reversal system as specified in claim 3 wherein said conical aft dome has an aft extension and wherein said stop means comprises an annular ring that is mounted on said aft dome extension.

9. A thrust reversal system as specified in claim 8 wherein said control means comprise mechanical shock absorbing means including crushable soft aluminum disposed between said cover and said annular ring.

10. A thrust reversal system as specified in claim 3 wherein an aft closure is provided for the motor aft dome, and wherein said stop means comprises a circumferential flange that is formed on the aft closure.

11. A thrust reversal system as specified in claim 10 wherein said control means comprise mechanical shock absorbing means including crushable soft aluminum disposed between said cover and the circumferential flange on the aft closure.

12. A thrust reversal system as specified in claim 1 wherein said cover upon movement from said first position to said second position forms in cooperation with said conical aft dome a plenum chamber and a reverse thrust nozzle having an effective throat, gases exiting said circumferential band of ports flowing into said plenum chamber and from said plenum chamber through said throat, the location and effective area of the throat being established by the stroke length of said cover in moving from said first position to said second position, and wherein the total area of the ports is greater than the total area of the throat whereby the changes of gas flow direction occur at subsonic velocities.

13. A thrust reversal system as specified in claim 12 wherein the location of said effective throat is downstream of said ports.

14. A thrust management system for a rocket motor having wall means defining a combustion chamber, a portion of said wall means forming a conical rocket motor aft dome having a nozzle formed therein aft thereof, comprising outlet port means formed in the wall means of the combustion chamber adjacent the nozzle, and plenum chamber forming means associated with a portion, at least, of the wall means of the combustion chamber including the port means, gases from the combustion chamber flowing through the port means into the plenum chamber when the plenum chamber is formed, the plenum chamber when formed having an effective throat outboard and forward thereof for the flow of gases therefrom, the area of the effective throat being less than the total area of the port means whereby the changes of gas flow direction occur at subsonic velocities at which friction and change in momentum of the gases effect the smallest losses.

15. A thrust management system as specified in claim 14 wherein the angle of the conical rocket motor aft dome with respect to the axis thereof is about 25°.

16. A method of managing the thrust of a rocket motor having a nozzle and a combustion chamber having a wall, the nozzle being aft of the combustion chamber, comprising the steps of providing ports in the wall of the combustion chamber adjacent the nozzle, forming a plenum chamber about a portion, at least, of the wall of the combustion chamber, establishing an effective throat for the plenum chamber outboard and forward thereof for the flow of gases therefrom, and diverting a portion of the combustion chamber gases to the plenum chamber through the ports in the combustion chamber wall, the area of the throat of the plenum chamber being less than the total area of the ports whereby the changes of gas flow direction occur at subsonic velocities at which friction and change in momentum of the gases effect the smallest losses.

17. A thrust reversal system for a rocket motor having a wall defining a combustion chamber, a portion of said wall forming a conical rocket motor aft dome having a central nozzle therein, a plurality of outlet ports formed in a circumferential band in the wall of the aft dome, each of said ports communicating exteriorly of the combustion chamber, a piston cover mounted on the motor and normally held in a first position against the aft dome to seal said ports to permit normal operating combustion pressure within the combustion chamber, said cover being movable to a second position to uncover said ports, stop means formed on the rocket motor to limit the extent of movement of said cover, releasable means normally retaining said cover in said first position, said cover, when released by said releasable means, being moved to said second position by pressure in said combustion chamber, and means to control the time of movement of said cover from said first position to said second position, wherein said control means comprise shock absorbing means disposed between said cover and said stop means.

18. A thrust reversal system as specified in claim 17 wherein said shock absorbing means are hydraulic means.

19. A thrust reversal system as specified in claim 18 wherein said hydraulic means includes a hydraulic chamber formed by said aft dome, said cover and said stop, said hydraulic chamber containing hydraulic fluid, and means to control a flow of said hydraulic fluid out of said hydraulic chamber.

20. A thrust reversal system as specified in claim 19 wherein said means to control the flow of fluid out of said hydraulic chamber comprise solenoid valve means.

21. A thurst reversal system as specified in claim 20 including guide pin means mounted in said aft dome wall means to guide the movement of said cover from said first position to said second position.

22. A thrust reversal system as specified in claim 17 wherein said shock absorbing means comprise mechanical means that allow unrestrained movement of said cover during an initial portion of its movement between said first and second positions.

23. The invention as specified in claim 22 wherein said mechanical means comprise crushable soft aluminum disposed between said cover and said stop means.

24. A thrust reversal system as specified in claim 2 wherein the angle of the forward surface of said cover with respect to the horizontal axis of the motor is substantially the same as the angle of the surface of the conical aft dome over an area thereof in which said ports are formed whereby, upon movement of said cover from said first to said second position, a generally annular conical plenum chamber is formed into which flow gases exiting said ports, the gas flow area increasing with radial position of the forward surface of said cover with respect to said ports, and wherein said piston cover, in uncovering said ports, forms in cooperation with said conical aft dome a reverse thrust nozzle having an effective throat through which gases from said plenum chamber flow, the length of the stroke of said piston cover in uncovering said ports establishing the time required to reach reverse thrust and the location and area of said effective throat where the transition from subsonic to supersonic gas flow occurs.

25. A thrust reversal system as specified in claim 24 wherein said conical aft dome has an aft extension and wherein said stop means comprises an annular ring that is mounted on said aft dome extension, and wherein said cover has an aft extension and said control means comprise hydraulic shock absorbing means including a hydraulic chamber formed by said aft dome, the cover aft extension, and said annular ring, said hydraulic chamber containing hydraulic fluid, an orifice in the cover aft extension, and means to control the discharge of fluid from said hydraulic chamber through said orifice.

26. A thrust control system as specified in claim 17, wherein the rocket motor has a longitudinal axis that passes centrally of the conical aft dome and the central nozzle, the angle of the aft dome with respect to the longitudinal axis being about 25°, and wherein said cover has forward and aft surfaces, the forward surface facing the conical aft dome, the angle of the forward surface of the cover with respect to the horizontal axis of the motor being substantially the same as the angle of the surface of the conical aft dome over an area thereof in which said ports are formed whereby, upon movement of said cover from said first to said second position, a generally annular conical plenum chamber is formed into which gases exiting said ports flow, the gas flow velocity increasing with radial position of the forward surface of the cover with respect to said ports.

27. A thrust reversal system as specified in claim 26 wherein each of said pbrts is formed in the wall of the conical aft dome with its axis perpendicular to the wall of the conical aft dome.

28. A thrust reversal system as specified in claim 26 wherein each of said ports is formed in the wall of the conical aft dome with its axis perpendicular to the longitudinal axis of the motor.

29. A thrust reversal system as specified in claim 26 wherein each of said ports is formed in the wall of the conical aft dome with its axis parallel to the longitudinal axis of the motor.

30. A thrust reversal system as specified in claim 26 wherein said conical aft dome has an aft extension and wherein said stop means comprises an annular ring that is mounted on the said aft dome extension.

31. A thrust reversal system as specified in claim 26 wherein an aft closure is provided for the motor aft dome and wherein said stop means comprises a circumferential flange that is formed on the aft closure.

32. A thrust reversal system as specified in claim 26 wherein the number, size and orientation of the ports and the stroke length of the cover are pre-set to provide a desired mass flow characteristic in said plenum chamber.

33. A thrust reversal system as specified in claim 26 wherein said cover, in uncovering said ports, forms in cooperation with the conical aft dome a reverse thrust nozzle having an effective throat through which gases from said plenum chamber flow, said throat being located downstream of the band of ports, and the total area of the ports being greater than the total area of the throat whereby the changes of gas flow direction occur at subsonic velocities.

* * * * *

UNITED STATES PATENT AND TRADEMARK OFFICE
CERTIFICATE OF CORRECTION

PATENT NO. : 4,484,439
DATED : November 27, 1984
INVENTOR(S) : Victor Singer, et al It is certified that error appears in the above—identified patent and that said Letters Patent is hereby corrected as shown below:

Column 10, line 51, "df" should read --of--.

Column 13, line 56, "2" should read --17-- so that claim 24 correctly depends from claim 17.

Column 14, line 36, "pbrts" should read --ports--.

Signed and Sealed this

Thirtieth Day of July 1985

[SEAL]

Attest:

DONALD J. QUIGG

Attesting Officer       Acting Commissioner of Patents and Trademarks